No. 858,058.　　　　　　　　　　　　　　　PATENTED JUNE 25, 1907.
P. A. BREDSVOLD.
SPEED CHANGING GEARING.
APPLICATION FILED AUG. 27, 1906.

2 SHEETS—SHEET 1.

WITNESSES

INVENTOR
P. A. Bredsvold.
BY
ATTORNEYS

No. 858,058. PATENTED JUNE 25, 1907.
P. A. BREDSVOLD.
SPEED CHANGING GEARING.
APPLICATION FILED AUG. 27, 1906.

2 SHEETS—SHEET 2.

WITNESSES:
S. G. Stout.
W. A. Alexander.

INVENTOR
P. A. Bredsvold.
BY
ATTORNEYS

UNITED STATES PATENT OFFICE.

PAUL A. BREDSVOLD, OF ST. LOUIS, MISSOURI, ASSIGNOR OF ONE-HALF TO HERBERT A. VROOMAN, OF ST. LOUIS, MISSOURI.

SPEED-CHANGING GEARING.

No. 858,058.  Specification of Letters Patent.  Patented June 25, 1907.

Application filed August 27, 1906. Serial No. 332,210.

*To all whom it may concern:*

Be it known that I, PAUL A. BREDSVOLD, a citizen of the United States, residing at the city of St. Louis, in the State of Missouri, have invented a certain new and useful Speed-Changing Gearing, of which the following is such a full, clear, and exact description as will enable any one skilled in the art to which it appertains to make and use the same, reference being had to the accompanying drawings, forming part of this specification.

My invention relates to a speed changing gearing which may be used for various purposes, but is particularly adapted for use in connection with motor driven vehicles.

The object of my invention is to provide a speed changing gearing, by means of which the speed can be readily changed without stopping the motor and which can also be used as a brake and to reverse the mechanism.

Figures 1, 2, 3:
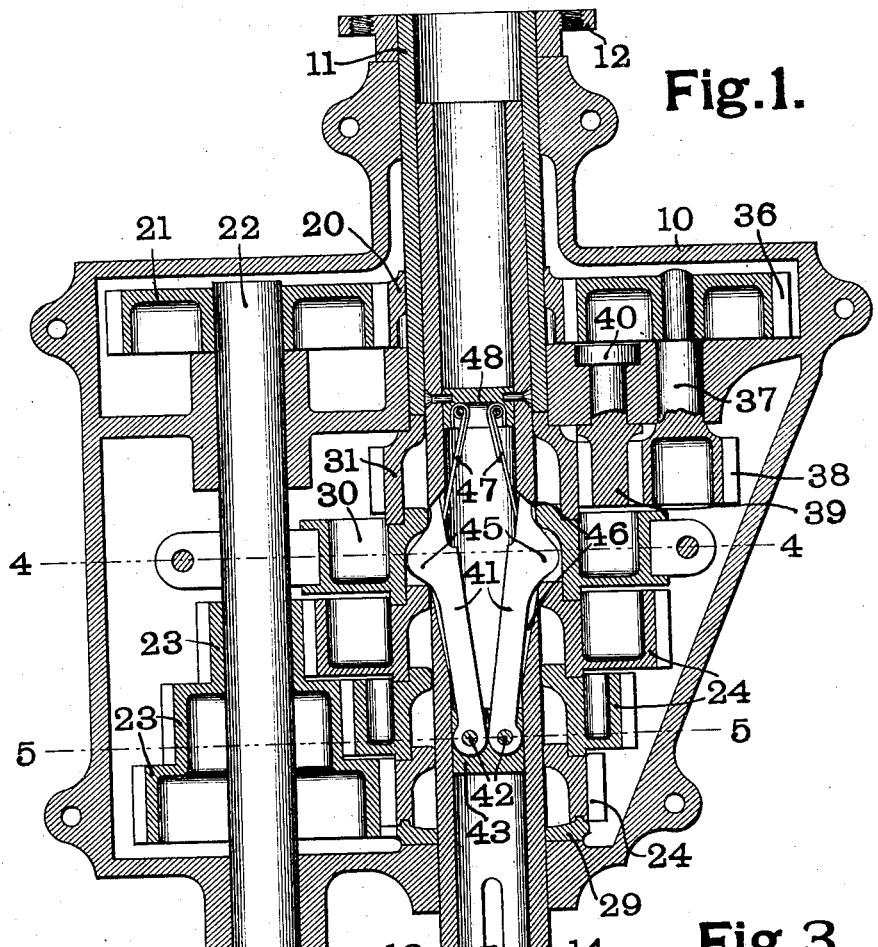
Figure 4:
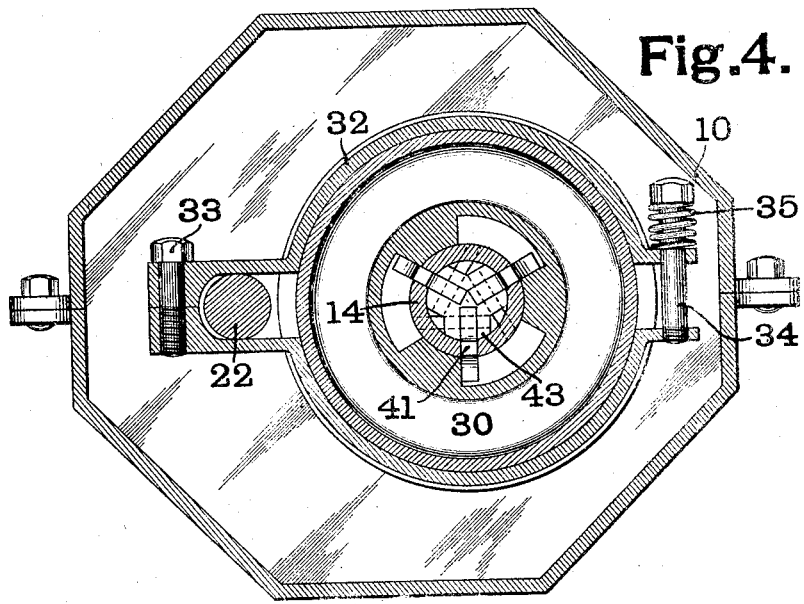
Figure 5:
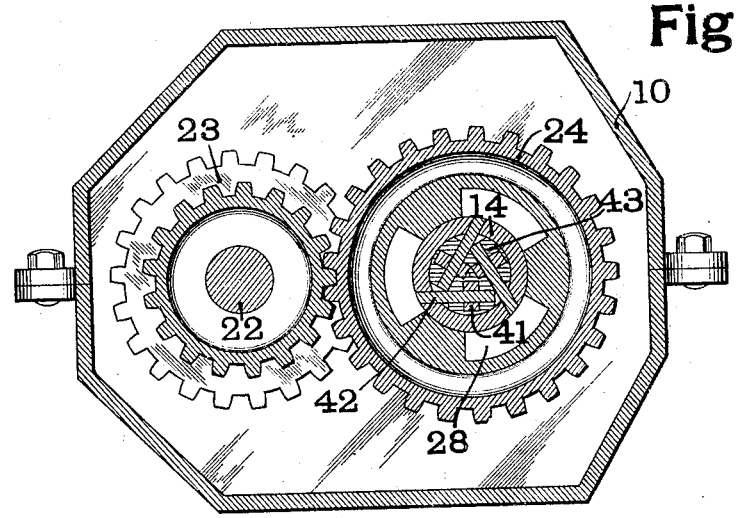

In the accompanying drawings, which illustrate one form of gearing made in accordance with my invention, Figure 1 is a longitudinal central section; Figs. 2 and 3 are detail views of one of the loosely mounted spur gears; Fig. 4 is a section on the line 4—4 of Fig. 1, and Fig. 5 is a section on the line 5—5 of Fig. 1.

Like marks of reference refer to similar parts in the several views of the drawings.

10 represents the casing of the gearing. This casing 10 is preferably made oil-tight, so that the gearing may run in oil. Journaled in one end of the casing 10 is the hollow driving shaft 11. This shaft 11 is connected to a part driven by the motor by any suitable means, such, for instance, as the collar 12 shown in Fig. 1. Arranged coaxially with the driving shaft 11 is the driven shaft 13. Extending between the driving shaft 11 and the driven shaft 13 is a hollow connecting shaft 14, which telescopes within the driving shaft 11 at one end and over the driven shaft 13 at the opposite end. The shafts 13 and 14 are connected by means of a key 15 passing through the shaft 13 and having its ends in slots 16 in the shaft 14. The shafts 13 and 14 are thus incapable of independent rotation. The shaft 14, however, freely rotates in the shaft 11. The shaft 14 is provided with a grooved collar 17, which is engaged by a shifting lever 18, by means of which the shaft 14 is moved longitudinally to change the speed of the gearing, as will be hereinafter described.

Secured to the driving shaft 11 near one end of the casing is a spur gear 20. Meshing with this spur gear 20 is a spur gear 21 rigidly secured to the end of a counter shaft 22. Secured to the counter shaft 22 near its opposite end are three spur gears 23, preferably formed integral, as shown in Fig. 1. The spur gears 23 vary in size and mesh with spur gears 24 loosely mounted on the connecting shaft 14, so that the said gears 24 are driven at varying speeds. Each of the spur gears 24 is provided at one end with a bearing 25 on the connecting shaft 14 and at the other with an enlarged bearing 26 on a hub or projection 27 of the adjacent gear. The portion of the inner face of the gear between these bearings 26 and 27 is provided with notches or recesses 28, preferably three in number, which are adapted to be engaged by clutch mechanism carried by the shaft 14, as will be hereinafter described.

In order to support the outer end of the smaller spur gear 24, I provide a small blank gear 29, as shown in Fig. 1. In addition to the spur gears 24, I mount upon the connecting rod 14 a braking drum 30 and a reversing gear 31, each of which is provided with bearings 25 and 26 and recesses 28 like the gears 24. Surrounding the braking drum 30 is a band brake 32 shown in detail in Fig. 4. This brake 32 is preferably formed of two parts connected together around the countershaft 22 at one end by means of a bolt 33, while the other ends, which are some distance apart, are connected by means of a bolt 34 having a coil spring 35 between its head and the adjacent lug of the band brake 32, thus by tightening the bolt 34, the friction of the brake can be regulated. The spur gear 20 hereinbefore referred to, in addition to the spur wheel 21, meshes with a spur wheel 36 rigidly connected to one end of a short countershaft 37, the opposite end of which carries a spur gear 38. From the spur gear 38 the reversing gear hereinbefore referred to is actuated. In order, however, to reverse the direction of the gear 31 a small intermediate gear 39 carried on a stud 40 is interposed between the two said gears. The clutch mechanism for engaging with the recesses 28 of the gears 24, and 31 and the drum 30 consists of fingers 41 preferably three in number, which are pivoted by means of pins 42 in a block 43 rigidly secured within the connecting shaft 14. Each of these fingers 41 is provided with a rounded knuckle 45 best shown in Fig. 1, which projects through a slot 46 in the connecting shaft 14, so as to engage with the recess 28 of one of the gears 24, or 31 and the drum 30. The fingers 41 are normally held in their extended position by means of springs 47 carried by a block 48 secured in the connecting shaft 14.

The operation of my gearing will be evident from the above description. The driving shaft 11 being rotated, its motion will be communicated through the gears 20 and 21 to the countershaft 22. The gears 23 carried by the countershaft 22 will thus cause the loosely mounted gears 24 to rotate on the connecting shaft 14 at various speeds. At the same time the movement of the shaft 11 will be communicated through the spur gears 20 and 36 to the second countershaft 37 and thence through the gears 38 and 39 to the reverse gear 31, so that the said reverse gear will be driven in the opposite direction from the gears 24. The braking drum 30 normally remains stationary under the influence of the band brake 32. If the shaft 14 is now moved longitudinally by means of the shifting lever 18 until the knuckles 45 of the fingers 41 engage with the notches 28 of the largest spur wheel 24, the apparatus will be run at the slowest speed. By moving the shaft 14 so that the said knuckles 45 engage with the intermediate wheel 24, the apparatus will be run at the intermediate speed, while if they engage with the smallest wheel 24, it will be run at the fastest speed. When the knuckles engage with the braking drum 30, as shown in Fig. 1, the apparatus will be disconnected from the driving mechanism and the action of the band brake 32 will bring it to rest, while if the shaft 14 is moved to its extreme limit in the opposite direction, the knuckles 45 will engage with the reversing wheel 31 and thus drive the apparatus in the reverse direction.

Having fully described my invention, what I claim as new and desire to secure by Letters Patent of the United States, is—

1. In a speed changing gearing, the combination with a pair of shafts, of a countershaft geared to one of said first named shafts, a set of gears driven at varying speeds from said countershaft, means for independently connecting each of said gears to the other of said first named shafts, and a braking device also adapted to be connected to said latter shaft.

2. In a speed changing gearing, the combination with a pair of coaxial shafts, of a countershaft geared to one of said first named shafts, a set of gears driven at varying speeds from said countershaft, means for independently connecting each of said gears to the other of said first named shafts, and a braking device also adapted to be connected to said latter shaft.

3. In a speed changing gearing, the combination with a pair of shafts, of a countershaft geared to one of said first named shafts, a set of gears driven at varying speeds from said countershaft, means for connecting each of said gears independently to the other of said first named shafts, a reversing gear and a braking device also adapted to be connected to said latter shaft, and means for driving said reversing gear.

4. In a speed changing gearing, the combination with a pair of coaxial shafts, of a countershaft geared to one of said first named shafts, a set of gears driven at varying speeds from said countershaft, means for connecting each of said gears independently to the other of said first named shafts, a reversing gear and a braking device also adapted to be connected to said latter shaft, and means for driving said reversing gear.

5. In a speed changing gearing, the combination with a pair of coaxial shafts, of a connecting shaft non-rotatable relatively to one and telescoping with both of said first named shafts, a countershaft geared to one of said first named shafts, a set of gears driven at varying speeds from said countershafts and loosely mounted on said connecting shaft, and clutch mechanism carried by said connecting shaft and movable from one to another of said gears.

6. In a speed changing gearing, the combination with a pair of coaxial shafts, of a connecting shaft non-rotatable relatively to one and telescoping with both of said first named shafts, a countershaft geared to one of said first named shafts, a set of gears driven at varying speeds from said countershaft and loosely mounted on said connecting shaft, a braking device also loosely mounted on said connecting shaft, and clutch mechanism carried by said connecting shaft and movable from one to another of said gears.

7. In a speed changing gearing, the combination with a pair of coaxial shafts, of a connecting shaft non-rotatable relatively to one and telescoping with both of said first named shafts, a countershaft geared to one of said first named shafts, a set of gears driven at varying speeds from said countershaft and loosely mounted on said connecting shaft, a reversing gear also loosely mounted on said connecting shaft, means for driving said reversing gear and clutch mechanism carried by said connecting shaft and movable from one to another of said gears.

8. In a speed changing gearing, the combination with a pair of coaxial shafts, of a connecting shaft non-rotatable relatively to one and telescoping with both of said first named shafts, a countershaft geared to one of said first named shafts, a set of gears driven at varying speeds from said countershaft and loosely mounted on said connecting shaft, a reversing gear and a braking device also loosely mounted on said connecting shaft, means for driving said reversing gear and clutch mechanism carried by said connecting shaft and movable from one to another of said gears.

9. In a speed changing gearing, the combination with a shaft, of gears loosely mounted on said shaft and each having a bearing at one end on said shaft and at the other on an adjacent gear, said gears being provided with recesses in their inner faces between said bearings, a clutch member carried by said shaft, means for causing relative longitudinal movement between said gears and shaft to cause said clutch mechanism to engage with the recesses of different gears, and means for driving a plurality of said gears at varying speeds.

10. In a speed changing gearing, the combination with a shaft, of gears loosely mounted on said shaft and each having a bearing at one end on said shaft and at the other on an adjacent gear, said gears being provided with recesses in their inner faces between said bearings, a clutch member carried by said shaft, means for causing relative longitudinal movement between said gears and shaft to cause said clutch mechanism to engage with the recesses of different gears, means for driving a plurality of said gears at varying speeds, and a braking device on said shaft.

11. In a speed changing gearing, the combination with a shaft, of gears loosely mounted on said shaft and each having a bearing at one end on said shaft and at the other on an adjacent gear, said gears being provided with recesses in their inner faces between said bearings, a clutch member carried by said shaft, means for causing relative longitudinal movement between said gears and shaft to cause said clutch mechanism to engage with the recesses of different gears, means for driving a plurality of said gears at varying speeds, and means for driving one of said gears in a reverse direction.

12. In a speed changing gearing, the combination with a shaft, of gears loosely mounted on said shaft and each having a bearing at one end on said shaft and at the other on an adjacent gear, said gears being provided with recesses in their inner faces between said bearings, a clutch member carried by said shaft, means for causing relative longitudinal movement between said gears and shaft to cause said clutch mechanism to engage with the recesses of different gears, means for driving a plurality of said gears at varying speeds, a braking device on said shaft, and means for driving one of said gears in a reverse direction.

13. In a speed changing gearing, the combination with a pair of coaxial shafts, of a connecting shaft non-rotatable relatively to one and telescoping with both of said first named shafts, a pair of countershafts geared to one of said first named shafts, gears loosely mounted on said connecting shaft and each having a bearing at one end on said shaft and at the other on an adjacent gear, said gear being provided with recesses in their inner faces between said bearings, a clutch member carried by said connecting shaft and adapted to engage with the recesses of different gears, means for driving a plurality of said gears at varying speeds from one of said countershafts, and means for driving one of said gears in a reverse direction from the other of said countershafts.

14. In a speed changing gearing, the combination with a pair of coaxial shafts, of a connecting shaft non-rotatable relatively to one and telescoping with both of said first named shafts, a pair of countershafts geared to one of said first named shafts, gears loosely mounted on said connecting shaft and each having a bearing at one end on said shaft and at the other on an adjacent gear, said gears being provided with recesses in their inner faces between said bearings, a clutch member carried by said connecting shaft and adapted to engage with the recesses of different gears, means for driving a plurality of said gears at varying speeds from one of said countershafts, means for driving one of said gears in a reverse direction from the other of said countershafts, and a braking device on said shaft.

In testimony whereof, I have hereunto set my hand and affixed my seal in the presence of the two subscribing witnesses.

PAUL A. BREDSVOLD. [L. S.]

Witnesses:
W. A. ALEXANDER,
BENNETTE PIKE.